(12) United States Patent
Park (10) Patent No.: US 6,417,240 B1
(45) Date of Patent: Jul. 9, 2002

(54) FOAMS PREPARED FROM BLENDS OF SYNDIOTACTIC POLYPROPYLENES AND THERMOPLASTIC POLYMERS

(75) Inventor: Chung Poo Park, Baden-Baden (DE)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/744,192

(22) PCT Filed: Aug. 26, 1999

(86) PCT No.: PCT/US99/19410

§ 371 (c)(1),
(2), (4) Date: Mar. 29, 2001

(87) PCT Pub. No.: WO00/12594

PCT Pub. Date: Mar. 9, 2000

Related U.S. Application Data (60) Provisional application No. 60/098,362, filed on Aug. 28, 1998.

(51) Int. Cl.⁷ .................................................. C08J 9/00
(52) U.S. Cl. .......................... 521/59; 521/134; 521/139; 521/142; 521/149
(58) Field of Search ........................ 521/59, 142, 149, 521/134, 139

(56) References Cited

U.S. PATENT DOCUMENTS 6,051,618 A * 4/2000 Tabaksblat ................... 521/60

FOREIGN PATENT DOCUMENTS

JP 08 231747 A * 8/1992

\* cited by examiner

Primary Examiner—Morton Foelak

(57) ABSTRACT

Foams prepared from a blend of a syndiotactic polypropylene (sPP) resin and a foamable thermoplastic polymer resin are provided which exhibit a combination of desirable properties which have heretofore been difficult, if not impossible, to achieve. The foams of the present invention are useful in applications such as thermal insulation, packaging, and the formation of molded articles such as cups, and trays.

36 Claims, 1 Drawing Sheet

FIG. 1

Foam as extruded

FIG. 2

Foam aged in oven at 120°C for 5 days

FOAMS PREPARED FROM BLENDS OF SYNDIOTACTIC POLYPROPYLENES AND THERMOPLASTIC POLYMERS

This application is a 371 OF PCT/US99/19410 filed Aug. 26, 1999, which claims the benefit of U.S. Ser. No. 60/098,362 filed Aug. 28, 1998.

This invention relates to foams in general, and more particularly, to foams prepared from a blend of syndiotactic polypropylenes and foamable thermoplastic polymer resins.

Foams are used in a number of applications, including thermal insulation, packaging, and the formation of molded articles such as cups, and trays. Depending upon the end-use of the foam, it is desirable that the foam exhibits particular properties or combinations of properties. For example, when utilized as an insulating material or cushion packaging material, expansion of the foam to low densities is quite desirable.

In addition, foams having a high temperature of distortion are desirable for a number of applications, including insulation in high temperature environments. Depending upon the particular use of such insulating foams, it is also desirable that such foams be flexible in addition to having a high temperature of distortion. The degree of flexibility and the heat distortion requirements vary depending on the end-use of the insulating foam. For example, in some automotive uses or for insulation of hot-water pipes, a flexible foam having a heat distortion temperature greater than 90° C., or greater than 110° C. to 120° C. in some instances, is required. In addition, in order to be in compliance with Underwriters Laboratory Test UL 1191 Appendix A, foams used as fillers in personal flotation devices need to withstand temperatures of 60° C. for a prolonged period of time in addition to being very soft and flexible.

However, it is difficult to achieve the properties of flexibility (that is, low modulus of elasticity) and high heat distortion temperature in the same foam. Typically, the flexibility of a given resin (that is, modulus of elasticity) and the heat distortion temperature of that resin are both directly related to the melting point of the resin. In other words, a resin having a low modulus of elasticity (that is, high flexibility) typically requires that the resin have a lower melting point whereas a resin having a high temperature of distortion typically requires that the resin have a higher melting point. In addition, even if properties of flexibility and high heat distortion temperature are found in the same resin or resin blend, the resin or resin blend may not be amenable to foaming, or to foaming by a convenient process such as the extrusion process. Branched-polyolefin resins prepared by the high-pressure-free-radical process are foamable to a flexible foam by extrusion, but the foam lacks the temperature resistance for certain applications. Examples of branched-polyolefin resins include low-density polyethylene homopolymer resins having densities in the range of from 0.915 g/cm$^3$ to 0.932 g/cm$^3$ and copolymers of ethylene with a vinyl ester such as vinyl acetate and methyl acrylate. Linear polyolefin homopolymer resins prepared by a catalytic process (using for example, Ziegler Natta or metallocene catalysts), such as high-density polyethylene and isotactic polypropylene (iPP) resins, have a relatively high heat distortion temperature but are difficult to foam by the extrusion process. In addition, the foams made from such stiff homopolymer resins lack flexibility. A less stiff linear copolymer resin can be made by the catalytic process but the resin suffers from the same lack of foamability as do the homopolymers. The use temperature of a polyolefin resin foam can be increased by cross-linking. For example, a cross-linked foam prepared from a low-density polyethylene resin may be used at a temperature higher than for an uncross-linked foam but the use temperature, which is less than 100° C., is not sufficiently high for some applications. In addition, a cross-linked foam is costly to manufacture and is not recyclable.

Foams prepared from a blend of high melting polyolefin resins (for example, high density polyethylene and iPP) and low density polyethylene (LDPE) resin are difficult to expand to a low density foam by extrusion processes, since the foam expansion relies on the freezing transition of the high melting resin which has a poor foamability. When applied to the cross-linking approach, such a blend causes another type of difficulty. In that process, a foamable composition is extruded into a sheet at a low temperature where the blowing agent and the cross-linking agent remain substantially unactivated. Often, the required processing temperature for a high melting linear polyolefin exceeds the tolerable temperature for the blowing agent and the cross-linking agent and may prematurely activate them.

However, depending on the particular end-use, it is not always desirable that an insulation foam be flexible. Rigid foams having high temperatures of distortion are also desirable. Rigid insulation foams are often prepared from alkyl aromatic polymers, such as polystyrene, which due to environmental concerns, are increasingly expanded with carbon dioxide. However, low density foams, such as polystyrene, which are expanded with carbon dioxide exhibit a small cell size.

However, in order that a rigid foam be readily formed from the convenient extrusion process and be easily fabricated, it is necessary that the foam has an enlarged cell-size. A foam having a small cell size is not only difficult to extrude to a large cross-section but is also difficult to fabricate (for example, slice and cut to final shapes). In order for ready fabrication, it is desirable that the foam have a cell size greater than 0.4 mm.

There have been various attempts to prepare alkyl aromatic foams having an enlarged cell size by incorporating various additives which enlarge the cell size (see, for example, U.S. Pat. Nos. 4,229,396 and 5,489,407). However, typical cell-enlarging additives are difficult to feed into the extruder and tend to affect the heat distortion temperature of the foam product.

In addition to insulation foams having high temperatures of distortion, which are either 1) flexible or 2) rigid with enlarged cell size, flexible foams which are made from thermoplastic polymers having a $T_g$ above 0° C. are desirable for end-uses which require noise and vibration damping as well as for cushion packaging. When used for cushion packaging or vibration damping, a flexible foam protects the article by absorbing the impact and vibration energy in its cell structure. The energy is absorbed both in the gas and polymer phase. A foam having cell walls that irreversibly dissipate the mechanical energy into heat is desirable. A polymer resin dissipates mechanical energy most effectively at the glass transition temperature ($T_g$) of the resin (see, for example, Properties of Polymers, third edition, Chapter 14, "Acoustic Properties," ed. By D. W. Van Krevelen, Elsevier, Amserdam-London, New York-Tokyo, 1990). Most conventional polyolefin resins such as polyethylene and polypropylene are flexible, but have a relatively low $T_g$, that is, below 0° C. and are, therefore, not useful for cushion packaging or vibration damping end-uses.

Therefore, there remains a need in the art for 1) flexible foams having a high temperature of distortion; 2) rigid alkyl aromatic foams having a high heat of distortion and enlarged cell size which are conveniently made and wherein the heat of distortion is stable; and 3) flexible thermoplastic foams made from a thermoplastic polymer having a $T_g$ above 0° C.

Those needs are met by the present invention. Thus, the present invention provides polymer foams prepared from a blend of a syndiotactic polypropylene (sPP) resin and a foamable thermoplastic polymer resin.

Thus, in a first embodiment of the present invention, there are provided polymer foams prepared from a blend of a sPP resin and a flexible thermoplastic polymer resin which are flexible and have a high temperature of distortion. The polymer foams according to the first embodiment of the present invention are useful as insulating foams in high temperature environments wherein a flexible foam is desired, such as some automotive uses and insulation of hot-water pipes. In addition, since sPP resin has a $T_g$ of 4° C., the polymer foams according to the first embodiment of the present invention are also suitable as cushion packaging or in noise or vibration damping products.

Typical blended polymer foams according to the first embodiment are as follows:

a blended polymer foam, comprising: a) from 0.1 percent to 60 percent by weight of a sPP resin; and b) from 40 percent to 99.9 percent by weight of a flexible thermoplastic polymer resin;

a blended polymer foam, comprising: a) from 10 percent to 50 percent by weight of a sPP resin; and b) from 50 percent to 90 percent by weight of a flexible thermoplastic polymer resin; and a blended polymer foam, comprising: a) from 30 percent to 50 percent by weight of a sPP resin; and b) from 50 percent to 70 percent by weight of a flexible thermoplastic polymer resin.

In a second embodiment of the present invention, there are provided polymer foams prepared from a blend of a sPP resin and a rigid thermoplastic polymer resin which are rigid, have high temperatures of distortion, and have enlarged cell size. The sPP resin additive, which enlarges the cell size of the rigid thermoplastic polymer foams, is easily fed into the extruder, and does not affect the heat distortion temperature of the foam.

Typical blended polymer foams according to the second embodiment of the present invention are as follows:

a blended polymer foam comprising: a) from 0.1 percent to 60 percent by weight of a sPP resin; and b) from 40 percent to 99.9 percent by weight of a rigid thermoplastic polymer resin; and a blended polymer foam comprising: a) from 0.2 percent to 5 percent by weight of a sPP resin; and b) from 95 percent to 99.8 percent by weight of a rigid thermoplastic polymer resin.

The present invention provides foams prepared from a blend of a sPP resin and a foamable thermoplastic polymer resin. The blended polymer foams of the present invention exhibit a combination of desirable properties which have heretofore been difficult, if not impossible, to achieve.

Figure 1:
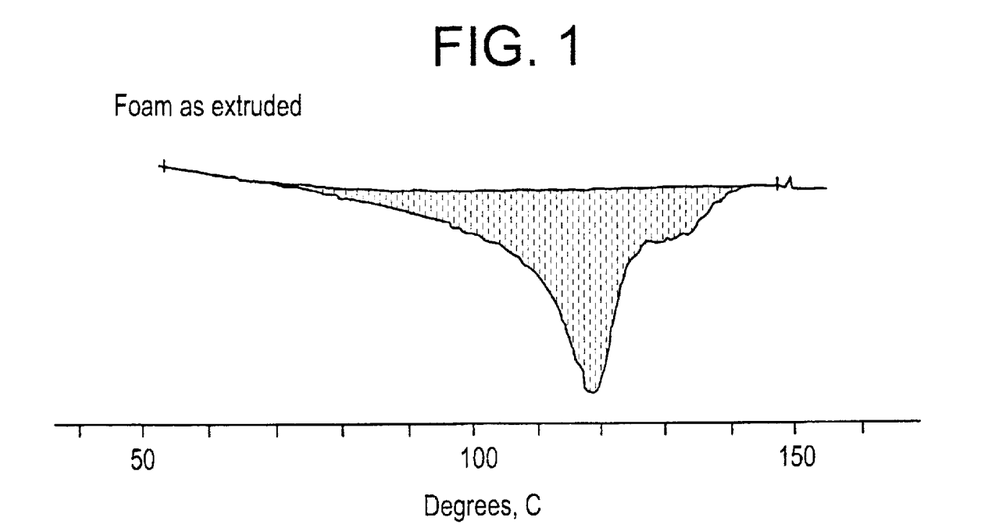
FIG. 1 depicts the differential scanning calorimetry thermogram of a foam according to the present invention as extruded.
Figure 2:
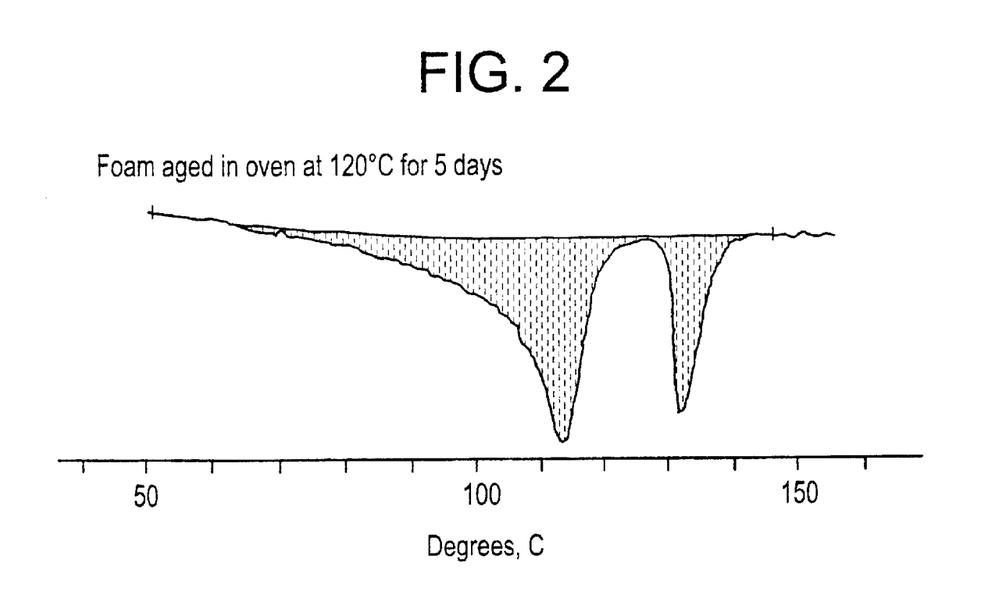
FIG. 2 depicts the differential scanning calorimetry thermogram of a foam according to the present invention after aging at 120° C. for 5 days.

For example, a first embodiment of the present invention provides polymer foams prepared from a blend of a sPP resin and a flexible thermoplastic polymer resin which foams are flexible and have a high distortion temperature. The blended polymer foams according to the first embodiment of the present invention are useful as insulating foams in high temperature environments wherein a flexible foam is desired, such as some automotive uses and insulation of hot-water pipes. The flexible, insulating foams of the first embodiment of the present invention exhibit increased dimensional stability over foams prepared from the flexible thermoplastic polymer resin alone. As stated above, flexible foams having a high heat distortion temperature are prepared by utilizing a flexible thermoplastic polymer resin as the foamable thermoplastic polymer resin in the blend. Although not wishing to be bound by any particular theory, it is believed that the addition of the sPP resin provides the blend foam with a high heat distortion temperature while causing little disruption of the foam expansion owing to the resin's slow rate of crystallization. The slow rate of crystallization of a sPP, which presents a long cycle-time problem in injection molding, is advantageously exploited in the preparation of the foams of the present invention. Due to the slow rate of crystallization, a sPP resin does not crystallize at the foaming temperature of a flexible thermoplastic polymer resin, but crystallizes at an ambient temperature or during secondary heating after a foam of the first embodiment of the present invention is prepared from the blend and stabilized. Once crystallized, the sPP resin component provides the blended foam with a relatively high heat of distortion due to the high melting point that is, 130° C.) of the crystals. This phenomenon is demonstrated by differential scanning calorimetry as shown in FIG. 1 and FIG. 2. FIG. 1 depicts the differential scanning calorimetry thermogram of a foam according to the present invention prepared from a 50/50 by weight blend of a LDPE resin and a sPP resin as extruded, showing an endotherm at approximately 113° C. and no endotherm at approximately 130° C., the melting point of sPP crystals. FIG. 2 depicts the differential scanning calorimetry thermogram of the foam of FIG. 1 after it has aged at approximately 120° C. for 5 days, showing an endotherm at approximately 113° C. and an endotherm at approximately 130° C., the melting point of sPP crystals. The differential scanning calorimetry thermograms shown in FIG. 1 and FIG. 2 demonstrate that the LDPE resin and the sPP resin are not miscible and that the sPP resin phase in the blend undergoes crystallization during heating at approximately 120° C.

In addition, the sPP resin component of the blend does not crystallize fully during aging of the foam at ambient temperature, but further crystallization is observed subsequently upon heating. This secondary crystallization may be beneficially utilized in thermoforming of the foam product in that the sPP molecules in the amorphous state allow deformation of the foam sheet to conform to the shape but become further crystallized during thermoforming thereby helping set the thermoformed article. The addition of the sPP resin also enhances the dimensional stability of the flexible foam. For example, a foam of the present invention prepared from a blend of a sPP resin and a LDPE resin expanded with isobutane was found to be more dimensionally stable than a LDPE resin foam expanded with isobutane. This increased dimensional stability is surprising given that at least one sPP resin has been reported to have a low crystallinity (about 30 percent) [see Wheat, W. R., "Rheological Explanations for Syndiotactic Polypropylene Behaviors," ANTEC 95 Preprint] and a relatively high permeability to gases and vapors [see Schardl, J. et al., "Syndiotactic Polypropylene Overview Clear Impact Polymer," ANTEC 95 Preprint].

In addition, the flexible, insulating polymer foams according to the first embodiment of the present invention are also suitable as cushion packaging or in noise and vibration damping products. The sPP resins have a $T_g$ of 4–6° C. and would therefore be effective in dissipating mechanical energy into heat. However, a sPP resin alone is not readily foamable by the extrusion process. In contrast, the blends of a sPP resin and a flexible thermoplastic polymer resin according to the first embodiment of the present invention are not only foamable, but the resultant foams also possess the properties of the individual component resins. Therefore, foams prepared from such an immiscible polymer blend are anticipated to posses different $T_{g\ and}$ thus, are anticipated to beneficially contribute to dampening of noise and vibration over a wide range of frequencies and temperatures.

The second embodiment of the present invention provides polymer foams prepared from a blend of a sPP resin and a rigid thermoplastic polymer resin which foams are rigid, have high temperatures of distortion, and have enlarged cell size. Thus, the blended polymer foams of the second embodiment of the present invention are suitable for use as insulating foams in applications which require that the foam be fabricated. The sPP resin additive, which enlarges the cell size of the rigid thermoplastic polymer foams, is easily fed into the extruder, and does not affect the heat distortion temperature of the foam. Given that polypropylene resins are not known to be compatible with at least one rigid thermoplastic polymer resin, such as polystyrene (see, for example, U.S. Pat. No. 4,386,187, Examples 18 and 22 and in U.S. Pat. No. 5,460,818, Example 3) and that foam expansion of an incompatible polymer blend is often difficult in the absence of a compatibilizing additive (see for example, U.S. Pat. No. 4,020,025), the fact that the addition of ax sPP resin to a polystyrene resin does not disrupt, but aid in expansion of the polystyrene resin, is somewhat unexpected.

In either embodiment of the present invention, the sPP resin and foamable thermoplastic polymer resin are typically blended together in weight ratios of from 0.1:99.9 to 60:40. In the first embodiment, where the foamable thermoplastic polymer resin is a flexible thermoplastic polymer resin, the preferred ratios of sPP resin to flexible thermoplastic polymer resin are from 10:90 to 50:50, with ratios of from 30:70 to 50:50 being especially preferred. In the second embodiment, where the foamable thermoplastic polymer resin is a rigid thermoplastic polymer resin, the preferred ratios of sPP resin to rigid thermoplastic polymer resin are from 0.1:99.9 to 5:95.

Suitable sPP resins for use in either embodiment include all substantially syndiotactic homopolymers of propylene and co-polymers of propylene with polymerizable monomers. Typical examples include homopolymers of polypropylene, copolymers of propylene with ethylene, and copolymers of propylene with 1-butene, with those homopolymers and co-polymers having a melt flow rate of from 0.05 dg/minute to 50 dg/minute being preferred, and those homopolymers and co-polymers having a melt flow rate of from 0.1 dg/minute to 10 dg/minute being especially preferred. Also preferred are sPP resins having a syndiotacticity of greater than 75 percent. An example of suitable sPP resin is a sPP resin having a melt index of 2 dg/minute (as determined by ASTM D-1238 at 230° C./2.16 kg), density of 0.88 g/cm$^3$, and melting point of 130° C. Examples of such sPP resins are EOD-96-28 and EOD-96-07 grade syndiotactic form copolymer polypropylene resins, available from Fina Oil and Chemical Company.

Thermoplastic resins suitable for use in the present invention include all types of thermoplastic polymers that are foamable by extrusion processes. Examples of flexible thermoplastic polymer resins suitable for the first embodiment of the present invention include, but are not limited to, flexible polyolefin resins, such as LDPE resins, ethylene/vinyl acetate copolymer resins, and iPP, with those resins having a melt index of from 0.1 dg/minute to 20 dg/minute being preferred, and those having a melt index of from 0.2 dg/minute to 10 dg/minute being especially preferred. In addition, when the flexible thermoplastic polymer resin is an ethylene/vinyl acetate copolymer, those resins having a vinyl acetate content of from 5 percent to 30 percent are preferred and those resins having a vinyl acetate content of from 8 percent to 20 percent are especially preferred. Further, when the flexible thermoplastic polymer resin is an iPP, those resins having a high melt strength when applied to the extrusion process where tan delta is less than 1.5 are preferred, and those having a tan delta of less than 1.2 are especially preferred (tan delta is the ratio of loss modulus to storage modulus determined using a 2.5 mm thick and 25 mm diameter specimen at 190° C. and 1 radian/second oscillating speed as shown in U.S. Pat. No. 5,527,573). An example of a suitable ethylene/vinyl acetate copolymer resin is ELVAX 460 brand resin, available from Du Pont-Dow Inc. An example of a suitable iPP resin is PRO-FAX PF-814 grade high melt strength iPP resin, available from Montell Polyolefins Co. NV. Examples of rigid thermoplastic polymer resins suitable for use in the second embodiment of the present invention are alkyl aromatic resins, such as polystyrene resins. An example of a suitable polystyrene for use in the second embodiment of the invention is a polystyrene having an average molecular weight of less than 240,000.

Optionally, a nucleating agent may be added to the foamable blend. The amount of nucleating agent employed to prepare the foams of the present invention will vary according to the desired cell size, the foaming temperature, and the composition of the nucleating agent. Useful nucleating agents include calcium carbonate, barium stearate, calcium stearate, talc, clay, titanium dioxide, silica, barium stearate, diatomaceous earth, mixtures of citric, and acid and sodium bicarbonate. When utilized, the amount of nucleating agent employed may range from 0.01 to 5 parts by weight per hundred parts by weight of the polymer resin blend (pph).

Blowing agents useful in making the present foams include all types of blowing agents known in the art; physical and chemical blowing agents and mixtures thereof, including inorganic blowing agents, organic blowing agents, and chemical blowing agents. Suitable inorganic blowing agents include carbon dioxide, nitrogen, argon, water, air, and helium. Organic blowing agents include aliphatic hydrocarbons having 1–6 carbon atoms, aliphatic alcohols having 1 to 3 carbon atoms, and fully and partially halogenated aliphatic hydrocarbons having 1 to 4 carbon atoms. Aliphatic hydrocarbons include methane, ethane, propane, n-butane, isobutane, n-pentane, and isopentane, neopentane. Aliphatic alcohols include methanol, ethanol, n-propanol, and isopropanol. Fully and partially halogenated aliphatic hydrocarbons include chlorocarbons, fluorocarbons, and chlorofluorocarbons. Chlorocarbons for use in this invention include methyl chloride, methylene chloride, ethyl chloride, and 1,1,1-trichloroethane. Fluorocarbons for use in this invention include methyl fluoride, methylene fluoride, ethyl fluoride, 1,1-difluoroethane (HFC-152a), 1,1,1-trifluoroethane (HGC-143a), 1,1,1,2-tetrafluoroethane (HFC-134a), 1,1,2,2-tetrafluoroethane (HFC-134), pentafluoroethane, perfluoroethane, 2,2-difluoropropane, 1,1,1-trifluoropropane, and 1,1,1,3,3-pentafluoropropane. Partially hydrogenated chlorofluorocarbons for use in this invention include chlorodifluoromethane (HCFC-22), 1,1-dichloro-1-fluoroethane (HCFC-141b), 1-chloro-1,1- difluoroethane (HCFC-142b), 1,1-dichloro-2,2,2-trifluoroethane (HCFC-123), and 1-chloro-1,2,2,2-tetrafluoroethane (HCFC-124). Fully halogenated chlorofluorocarbons may also be used but are not preferred for environmental reasons. Chemical blowing agents for use in this invention include azodicarbonamide, azodiisobutyronitrile, benzenesulfonhydrazide, 4,4-oxybenzene sulfonyl-semicarbazide, p-toluene sulfonyl semi-carbazide, N,N'-dimethyl-N,N'-dinitrosoterephthalamide, and trihydrazine triazine, sodium bicarbonate, and mixtures of sodium bicarbonate and citric acid. Mixtures of all these blowing agents are also contemplated within the scope of this invention. The type of the most suitable blowing agent depends on the process used to manufacture the foam body and the desired density of the foam. Preferred blowing agents for the extrusion process and batch process for making moldable beads are physical blowing agents, with volatile organic blowing agents being preferred. Preferred blowing agents for cross-linked foam processes are decomposable blowing agents and nitrogen.

The amount of blowing agent incorporated into the polymer melt material to make a foam-forming gel is from 0.1 to 5, preferably from 0.4 to 4, and most preferably from 0.9 to 3 gram moles per kilogram of polymer.

The present foams, optionally, further comprise an infrared absorber (transmission blocker) such as carbon black, graphite, and titanium dioxide, to enhance insulating capability. When utilized, the infrared absorber may comprise between 1.0 and 25 weight percent and preferably between 4.0 and 10.0 weight percent based upon the weight of the polymer blend in the foam. The carbon black may be of any type known in the art such as furnace black, thermal black, acetylene black, and channel black. A preferred carbon black is thermal black. A preferred thermal black has an average particle size of 150 nanometers or more.

It is preferred that the foams of the present invention exhibit dimensional stability. Although the sPP resin itself acts as a stability control agent, in some instances, it is desirable to include an additional stability control agent to further enhance dimensional stability of the foams of the present invention. For example, stability control agents in addition to the sPP resin may be desirable when the sPP resin is used at a level of less than 30 percent in a blend with a polyethylene or ethylene/vinyl acetate copolymer resin and the blend is expanded with isobutane. A stability control agent may be especially desirable in producing thick (that is, greater than 4 mm) sheet and plank products (thicker than 12 mm) of substantially closed-cell structure from the foregoing blend. In contrast, an additional stability control agent is probably not necessary or desirable when forming substantially open-celled foams.

Dimensional stability is measured by taking the foam volume during aging as a percentage of the initial volume of the foam, measured within 30 seconds after foam expansion. Using this definition, a foam which recovers 80 percent or more of the initial volume within a month is tolerable, whereas a foam which recovers 85 percent or more is preferred, a foam which recovers 90 percent or more is especially preferred. Volume is measured by a suitable method such as cubic displacement of water.

Preferred stability control agents include amides and esters of $C_{10-24}$ fatty acids. Such agents are seen in U.S. Pat. Nos. 3,644,230 and 4,214,054. Most preferred agents include stearyl stearamide, glycerol monostearate, glycerol monobenenate, and sorbitol monostearate. Typically, such stability control agents are employed in an amount ranging from 0.1 to 10 parts per hundred parts of the polymer.

Various additives may also be incorporated in the present foam such as inorganic fillers, pigments, antioxidants, acid scavengers, ultraviolet absorbers, flame retardants, processing aids, and extrusion aids.

The blended polymer foams of the present invention may be prepared by techniques and procedures well known to one of ordinary skill in the art and include extrusion processes as well as batch processes using a decomposable blowing agent and cross-linking, with extrusion processes being preferred.

The blended polymer foams of the present invention may be cross-linked or non-cross-linked. Excellent teachings to processes for making polymer foam structures and processing them are seen in C. P. Park, "Polyolefin Foam", Chapter 9, Handbook of Polymer Foams and Technology, edited by D. Klempner and K. C. Frisch, Hanser Publishers, Munich, Vienna, New York Barcelona (1991.

Non-cross-iinked foams of the present invention may be made by a conventional extrusion foaming process. The foam structure is generally prepared by heating a pre-mixed blend of the sPP resin and the thermoplastic polymer resin (that is, polymer material) to form a plasticized or melt polymer material, incorporating therein a blowing agent to form a foamable gel, and extruding the gel through a die to form the foam product. Prior to mixing with the blowing agent, the polymer material is heated to a temperature at or above its $T_g$ or melting point. The blowing agent may be incorporated or mixed into the melt polymer material by any means known in the art, such as with an extruder, mixer, or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Non-cross-linked foams of the present invention may be formed in a coalesced strand form by extrusion of the pre-mixed blend of the sPP resin and the thermoplastic polymer resin (that is, polymer material) through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one anther to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,324,720.

The present foam structure may also be formed into non-cross-linked foam beads suitable for molding into articles. The foam beads may be prepared by an extrusion process or a batch process. In the extrusion process, the foam strands coming out of a multi-hole die attached to a conventional foam extrusion apparatus are granulated to form foam beads. The foam beads, if necessary, are heated below the melting point of the sPP resin so that the sPP molecules can crystallize, thereby forming a pseudo-network structure that provides thermo-collapse resistance to the foam beads. In a batch process, discrete resin particles such as granulated resin pellets are suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484.

Cross-linked foams of the present invention may be prepared by either the cross-linked foam process employing a decomposable blowing agent or by conventional extrusion processes.

When utilizing the cross-linked foam process employing a decomposable blowing agent, cross-linked foams of the present invention may be prepared by blending and heating a pre-mixed blend of the sPP resin and the thermoplastic polymer resin (that is, polymer material) with a decomposable chemical blowing agent to form a foamable plasticized or melt polymer material, extruding the foamable melt polymer material through a die, inducing cross-linking in the melt polymer material, and exposing the melt polymer material to an elevated temperature to release the blowing agent to form the foam structure. The polymer material and the chemical blowing agent may be mixed and the melt blended by any means known in the art such as with an extruder, mixer, or blender. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer is extruded or conveyed through a die of desired shape to form a foamable structure. The foamable structure is then cross-linked and expanded at an elevated or high temperature (typically, 150° C. to 250° C.) such as in an oven to form a foam structure. When radiation cross-linking is used, the foamable structure is irradiated to cross-link the polymer material, which is then expanded at the elevated temperature as described above. The structure can advantageously be made in sheet or thin plank form according to the above process using either cross-linking agents or radiation.

In addition to use of a cross-linking agent or radiation in the cross-linked foam process employing a decomposable blowing agent, cross-linking may also be accomplished by means of silane cross-linking as described in C. P. Park, Supra, Chapter 9.

Cross-linked foams of the present invention may also be made into a continuous plank structure by an extrusion process utilizing a long-land die as described in GB 2,145, 961A. In that process, the polymer, decomposable blowing agent, and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

Cross-linked foams of the present invention may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. A version is that the polymer beads is impregnated with blowing agent, cooled down, discharged from the vessel, and then expanded by heating or with steam. In a derivative of the above process, styrene monomer may be impregnated into the suspended pellets along with the cross-linking agent to form a graft interpolymer with the polymer material. Blowing agent may be impregnated into the resin pellets while in suspension, or alternatively, in a non-hydrous state. The expandable beads are then expanded by heating with steam and molded by the conventional molding method for the expandable polystyrene foam beads.

The foam beads may them be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agents prior to charging to the mold. Excellent teachings of the above processes and molding methods are seen in C. P. Park, Supra, pp.227–233, U.S. Pat. Nos. 3,886,100, 3.959,189, 4,168,353, and 4,429,059. The foam beads can also be prepared by preparing a mixture of polymer, cross-linking agent, and decomposable mixtures in a suitable mixing device or extruder and forming the mixture into pellets, and heating the pellets to cross-link and expand.

There is another process for making cross-linked foam beads suitable for molding into articles. The polymer material is melted and mixed with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings of this process are seen in U.S. Pat. No. 3,616,365 and C. P. Park, Supra, pp.224–228.

In addition, silane cross-linking technology may be employed in the extrusion process. Teachings of this process are seen in C. P. Park, Supra, Chapter 9 and in U.S. Pat. No. 4,714,716. When silane cross-linking processes are utilized with conventional extrusion processes, a polymer is grafted with a vinyl functional silane or an azido functional silane and extruded to foams. The extruded foam is then exposed to warm humid air for the cross-linking to develop.

The cross-linked foams of the present invention may be prepared by the foam sheet process or foam bun stock process or any process described in C. P. Park, Supra, Chapter 9, pages 229 to 235.

Although, typically, substantially closed-celled in nature, the foams of the present invention may be open-celled or close-celled. In addition, the foams of the present invention have a cell size (that is, cell diameter) of from 0.01 mm to 10 mm, with 0.1 mm to 5 mm being preferred, and from 0.4 mm to 3 mm being particularly preferred. In addition, the foams of the present invention have a density of from 9 kg/m$^3$ to 200 kg/m$^3$, with densities of 11 kg/m$^3$ to 100 kg/m$^3$ being preferred, and 15 kg/m$^3$ to 50 kg/m$^3$ being most preferred.

The foams of the present invention may take any physical configuration known in the art, such as extruded sheet, rod, plank, profiles, beads, and buns. The foam structure may also be formed by molding of expandable beads into any of the foregoing configurations or any other configuration.

Thus, according to the above, the following foams represent typical foams of the present invention:

a blended polymer foam comprising: a) from 0.1 percent to 60 percent by weight of a sPP resin; and b) from 40 percent to 99.9 percent by weight of a foamable thermoplastic polymer resin;

a blended polymer foam comprising: a) from 0.1% to 60% by weight of a sPP resin; and b) from 40% to 99.9% by weight of a foamable thermoplastic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin; and b) from 40% to 99.9% by weight of a flexible thermoplastic polymer resin;

a blended polymer foam comprising: a) from 0.1% to 60% by weight of a sPP resin; and b) from 40% to 99.9% by weight of a flexible thermoplastic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$_3$;

a blended polymer foam comprising: a) from 0.1% to 60% by weight of a sPP resin; and b) from 40% to 99.9% by weight of a rigid thermoplastic polymer resin;

a blended polymer foam comprising: a) from 0.1% to 60% by weight of a sPP resin; and b) from 40% to 99.9% by weight of a rigid thermoplastic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin; and b) from 40% to 99.9% by weight of a flexible polyolefin resin;

a blended polymer foam comprising: a) from 0.1% to 60% by weight of a sPP resin; and b) from 40% to 99.9% by weight of a flexible polyolefin resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin; and b) from 40% to 99.9% by weight of a LDPE resin;

a blended polymer foam comprising: a) from 0.1% to 60% by weight of a sPP resin; and b) from 40% to 99.9% by weight of a LDPE, the foam having a density of 9 kg/M$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin which is a homopolymer of propylene; and b) from 40% to 99.9% by weight of a foamable thermoplastic polymer resin;

a blended polymer foam comprising: a) from 0.1% to 60% by weight of a sPP resin which is a homopolymer of propylene; and b) from 40% to 99.9% by weight of a foamable thermoplastic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin which is a homopolymer of propylene; and b) from 40% to 99.9% by weight of a flexible thermoplastic polymer resin;

a blended polymer foam comprising: a) from 0.1% to 60% by weight of a sPP resin which is a homopolymer of propylene; and b) from 40% to 99.9% by weight of a flexible thermoplastic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin which is a homopolymer of propylene; and b) from 40% to 99.9% by weight of a rigid thermoplastic polymer resin;

a blended polymer foam comprising: a) from 0.1% to 60% by weight of a sPP resin; and b) from 40% to 99.9% by weight of a rigid thermoplastic polymer resin which is a homopolymer of propylene, the foam having a density of 9 kg/M$^3$ to 300 kg/m$^3$, preferably 11 kg/M$^3$ to 100 kg/M$^3$, and more preferably 15 kg/m$^3$ to 50 kg/m$^3$;

a blended polymer foam comprising: a) from 0.1% to 60% by weight of a sPP resin which is a homopolymer of propylene; and b) from 40% to 99.9% by weight of a flexible polyolefin resin;

a blended polymer foam comprising: a) from 0.1% to 60% by weight of a sPP resin which is a homopolymer of propylene; and b) from 40% to 99.9% by weight of a flexible polyolefin resin, the foam having a density of 9 kg/M$^3$ to 300 kg/m$^3$, preferably 11 kg/m$^3$ to 100 kg/M$^3$, and more preferably 15 kg/M$^3$ to 50 kg/m$^3$;

a blended polymer foam comprising: a) from 0.1% to 60% by weight of a sPP resin which is a homopolymer of propylene; and b) from 40% to 99.9% by weight of a LDPE resin;

a blended polymer foam comprising: a) from 0.1% to 60% by weight of a sPP resin which is a homopolymer of propylene; and b) from 40% to 99.9% by weight of a LDPE resin, the foam having a density of 9 kg/M$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin which is a homopolymer of propylene having a syndiotacticity of greater than 75%; and b) from 40% to 99.9% by weight of a foamable thermoplastic polymer resin;

a blended polymer foam comprising: a) from 0.1% to 60% by weight of a sPP resin which is a homopolymer of propylene having a syndiotacticity of greater than 75%; and b) from 40% to 99.9% by weight of a foamable thermoplastic polymer resin, the foam having a density of 9 kg/m$^3$ to 300 kg/M$^3$, preferably 11 kg/m$^3$ to 100 kg/m$^3$, and more preferably 15 kg/M$^3$ to 50 kg/m$^3$;

a blended polymer foam comprising: a) from 0.1% to 60% by weight of a sPP resin which is a homopolymer of propylene having a syndiotacticity of greater than 75%; and b) from 40% to 99.9% by weight of a flexible thermoplastic polymer resin;

a blended polymer foam comprising: a) from 0.1% to 60% by weight of a sPP resin which is a homopolymer of propylene having a syndiotacticity of greater than 75%; and b) from 40% to 99.9% by weight of a flexible thermoplastic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin which is a homopolymer of propylene having a syndiotacticity of greater than 75%; and b) from 40% to 99.9% by weight of a rigid thermoplastic polymer resin;

a blended polymer foam comprising: a) from 0.1% to 60% by weight of a sPP resin having a syndiotacticity of greater than 75%; and b) from 40% to 99.9% by weight of a rigid thermoplastic polymer resin which is a homopolymer of propylene, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin; and b) from 40% to 99.9% by weight of an ethylene/vinyl acetate copolymer resin;

a blended polymer foam comprising: a) from 0.1% to 60% by weight of a sPP resin; and b) from 40% to 99.9% by weight of an ethylene/vinyl acetate copolymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin; and b) from 40% to 99.9% by weight of an iPP resin;

a blended polymer foam comprising: a) from 0.1% to 60% by weight of a sPP resin; and b) from 40% to 99.9% by weight of an iPP resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1% to 60% by weight of a sPP resin; and b) from 40% to 99.9% by weight of an alkyl aromatic polymer resin;

a blended polymer foam comprising: a) from 0.1% to 60% by weight of a sPP resin; and b) from 40% to 99.9% by weight of an alkyl aromatic polymer resin, the foam having a density of 9 kg/m$^3$ to 300 kg/m$^3$, preferably 11 kg/m$^3$ to 100 kg/m$^3$, and more preferably 15 kg/m$^3$ to 50 kg/m$^3$;

a blended polymer foam comprising: a) from 0.1 percent to 60 percent by weight of a sPP resin; and b) from 40 percent to 99.9 percent by weight of a polystyrene polymer resin;

a blended polymer foam comprising: a) from 0.1 percent to 60 percent by weight of a sPP resin; and b) from 40 percent to 99.9 percent by weight of a polystyrene polymer resin, the foam having a density of 9 kg/m$^3$ to 300 kg/M$^3$, preferably 11 kg/m$^3$ to 100 kg/m$^3$, and more preferably 15 kg/m$^3$ to 50 kg/m$^3$.

The following are examples of the present invention, and are not to be construed as limiting the scope of the invention. Unless otherwise indicated, all percentages, parts, or proportions are by weight.

The following examples of foams prepared from sPP resin and foamable thermoplastic polymer resin blends were prepared using a 19-mm diameter screw-type extruder having additional zones for mixing and cooling at the end of the usual sequential zones of feeding, melting and metering. An opening for blowing agent injection is provided on the extruder barrel between the metering and mixing zones. At the end of the cooling zone, there is attached a die orifice having an opening of rectangular shape. The height of the opening is adjustable while its width is fixed at 38 mm.

EXAMPLE 1

Preparation of a sPP Resin and LDPE Resin Blend Foam

Example 1 demonstrates the preparation of a foam according to the present invention which was prepared from a 50/50 by weight blend of LDPE resin and a sPP resin which had been expanded using isobutane as the blowing agent by an extrusion process. Tests performed on the foam prepared according to this example show that the polymer blend is foamable by extrusion, and the foam is dimensionally stable and withstands a relatively high temperature.

A 50/50 by weight granular blend of LDPE resin having a melt index of 0.7 dg/minute, (determined by ASTM D-1238 at 190° C./2.16 kg), a density of 0.923 g/cm$^3$, and a melting point of 115° C. (determined per the differential scanning calorimetry (DSC) at the peak of an endotherm during heating at 10° C./minute) and EOD 96-28 grade syndiotactic form copolymer polyproplyene resin (available from Fina Oil and Chemical Company) having a melt flow rate of 2 dg/minute (determined by ASTM D-1238 at 230° C./2.16 kg), a density of 0.88 g/cm$^3$, and a melting point of 130° C. was prepared.

The blend of granular resins and an additive package consisting of talcum powder (nucleating agent) at 0.2 parts per hundred parts of resins (pph) and Irganox 1010 brand antioxidant (available from Ciba-Geigy Corp) at 0.1 pph were fed into the extruder at a uniform rate of 3.26 kilograms per hour (kg/h). The temperatures at the extruder zones are maintained at 160° C. at the feeding zone, 190° C. at the melting zone, 200° C. at the metering zone, and 200° C. at the mixing zone. Isobutane (blowing agent) was injected into the mixing zone at a uniform rate of 414 g/h (12.7 pph). The temperature of the cooling zone was gradually reduced and the die opening adjusted to make a good foam. For example, at a cooling zone temperature of 107° C., die temperature of 105° C., and die opening of 1.0 mm, an excellent foam of substantially closed-cell structure (open-cell content approximately 32 percent per ASTM D-2856 Procedure A) was obtained. The foam had a density of 24.8 kg/m$^3$, cell size of 1.2 mm, thickness of approximately 12 mm and width of approximately 19 mm.

Test 1

Dimensional Stability of the Foam of Example 1

A foam specimen of approximately 15 cm in length was cut from the freshly prepared foam prepared in Example 1, and the volume of the foam specimen was measured at approximately 2 minutes after extrusion and then, periodically thereafter, during aging at an ambient temperature. The foam exhibited an excellent dimensional stability with no more shrinkage beyond 30 minutes after extrusion when its shrinkage bottomed out to about 97 percent of the original volume. The foam was fully recovered to over 100 percent of its original volume within a day.

Test 2

Heat Stability of the Foam of Example 1

One day after extrusion, the foam prepared in Example 1 was cut to a 8 cm-long specimen. The specimen was put in a convection oven maintained at 121° C. and its volume was monitored periodically. The foam volume, as a percentage of the original volume, is presented as a function of oven-exposure time as shown in Table I.

TABLE I

| Aging Time | 0 | 1.5 hours | 1 day | 2 days | 5 days |
|---|---|---|---|---|---|
| Foam Volume (%) | 100 | 78 | 75 | 70 | 71 |

As shown, the foam shrinks to 70 percent of the original volume and stays at that volume during a prolonged exposure to the high temperature whereas a polyethylene foam based on the same LDPE resin used in Example 1 was observed to collapse totally at that temperature. The resistance of the blend foam to high temperatures is further supported by the DSC thermograms shown in FIG. 1 and FIG. 2, discussed previously. In FIG. 1 and FIG. 2, the DSC thermograms of an as-extruded foam (FIG. 1) and an oven-aged foam (FIG. 2) are compared. The oven-aged foam was exposed to 121° C. temperature for five days. The oven-aged foam shows a sharp peak at approximately 130° C. in addition to one at approximately 113° C. In contrast, the as-extruded foam does not show a strong peak at 130° C. which is the melting peak of sPP crystals. The thermograms indicate that the LDPE resin and the sPP resin used in Example 1 are not miscible and that the sPP resin phase in the blend undergoes crystallization during heating at 121° C.

Test 3

Thermoforming Properties of the Foam of Example 1

Two 5 cm-long specimens were cut from the foam prepared in Example 1 and heated in a 121° C. oven for 5 minutes. Then, the heated foam specimens were taken out of the oven and immediately stacked one on top of the other with application of gentle pressure one against the other. The foam specimens developed satisfactory adhesion without experiencing a noticeable shrinkage, indicating that moldable foam beads can be prepared from the foam of Example 1 and that the foam of Example 1 can be thermoformed.

COMPARATIVE EXAMPLE A

Preparation of Foam Prepared from sPP Resin

The foam of Comparative Example A was prepared in order to test the foam expansion properties of a foam made from sPP resin alone.

EOD 96-28 grade syndiotactic form copolymer polyproplyene resin (available from Fina Oil and Chemical Company) having a melt-flow rate of 2 dg/minute. (determined by ASTM D-1238 at 230° C./2.16 kg), density of 0.88 g/cm$^3$, and melting point of 130° C., was blended with 0.4 pph talc (nucleating agent) and 0.1 pph Irganox 1010(Available from Ciba-Geigy Corp.). The blend was fed into the extruder at a uniform rate of 3.10 kg/h. The temperatures at the extruder zones were maintained at 160° C. at the feeding zone, 190° C. at the melting zone, 200° C. at the metering zone, and 200° C. at the mixing zone. Isobutane (blowing agent) was injected into the mixing zone at an uniform rate of 414 g/h (12.7 pph). The temperature of the cooling zone was gradually reduced from 160° C. to 80° C. with a decrement of approximately 5° C. at a time and held for 5 to 10 minutes at a temperature in order to see if a good foam can be made. The die temperature was maintained at the same temperature as the cooling zone. The die opening was maintained at 0.8 mm at a cooling zone temperature down to 95° C. Below 95° C., the die was opened slightly wider to relieve the increasing pressure.

Test 4

Foamability of sPP resin of Comparative Example A

The melt prepared in Comparative Example A above did not expand at all at temperatures down to 95° C. At temperatures below 95° C., the foam expanded slightly but immediately collapsed. At 80° C., the extruder pressure rose sharply, indicating that the melt was too viscous and freezing at the cooling zone. No further reduction in the cooling temperature could be tolerated. Conclusion: the sPP resin alone can not be expanded into a stable foam by the extrusion process.

EXAMPLE 2 AND COMPARATIVE EXAMPLE B

Preparation of a sPP Resin and LDPE Resin Blend Foam

Example 2 demonstrates the preparation of foams according to the present invention which were prepared from a blend of LDPE resin and sPP resin, wherein the percentage level of sPP resin is varied in order to examine the effect of the sPP resin level, in the blend, on the properties of foamability and the dimensional stability of the foam. Comparative Example B is a foam prepared from LDPE resin only.

Granular blends of LDPE resin having a melt index of 0.7 dg/minute (determined by ASTM D-1238 at 190° C./2.16 kg), a density of 0.923 g/cm$^3$, and a melting point of 115° C.(determined per the differential scanning calorimetry (DSC) at the peak of an endotherm during heating at 10° C./minute) and EOD 96-07 grade syndiotactic form copolymer polypropylene resin (Available from Fina Oil and Chemical Company), having a melt flow rate of 2 dg/minute, (Determined by ASTM D-1238 at 230° C./2.16 kg), a density of 0.88 g/cm$^3$, and a melting point of 130° C. in predetermined ratios, as shown in Table II, were prepared.

The blend of granular resins and 0.2 pph talcum powder (nucleating agent) was fed into the extruder at a uniform rate of 3.1 kg/h (due to a difference in the feeding characteristics among the blends, the actual extrusion rate varies slightly in the range from approximately 3 kg/h to 3.2 kg/h, even though an effort is made to keep the rate the same by adjusting the screw rotating speed). The temperatures at the extruder zones were maintained at 160° C. at the feeding zone, 190° C. at the melting zone, 200° C. at the metering zone, and 220° C. at the mixing zone. The cooling zone temperature was maintained as indicated in Table II. Isobutane (blowing agent) was injected into the mixing zone at the rate indicated in Table II. The temperature of the cooling zone was gradually reduced and the die opening adjusted to make a good foam. The die temperature was maintained at 110° C. for Comparative Example B, Examples Nos. 2.1 through 2.3, and at 105° C. for Examples Nos. 2.4 and 2.5. Foam samples were taken at the optimum cooling zone temperature for each formulation as shown in Table II and at a die opening which varies from 1.1 mm to 1.2 mm.

The dimensional data for the foams are summarized in Table II along with the density, cell size, and open cell data.

TABLE II

| Comp. Ex. or Ex. No. | sPP Level (%)[1] | Isobutane Level (pph)[2] | Foam Temp (° C.)[3] | Foam Density (kg/m³)[4] | Cell Size (mm)[5] | Open Cell (%)[6] | Dimensional Stability | | | |
|---|---|---|---|---|---|---|---|---|---|---|
| | | | | | | | Min. (%)[7] | 1 day (%) | 1 wk (%)[8] | 1 mon (%) |
| B | 0 | 9.2 | 108 | 38.0 | 0.43 | 13 | 64 | 67 | 92 | 100 |
| 2.1 | 10 | 9.1 | 109 | 41.8 | 0.90 | 18 | 59 | 59 | 80 | 94 |
| 2.2 | 20 | 9.3 | 113 | 36.0 | 0.81 | 12 | 73 | 78 | 92 | 98 |
| 2.3 | 30 | 9.4 | 113 | 36.2 | 1.25 | 16 | 89 | 89 | 95 | 98 |
| 2.4 | 40 | 9.4 | 109 | 41.3 | 1.16 | 47 | 98 | 98 | 98 | 102 |
| 2.5 | 50 | 9.8 | 107 | 56.1 | 1.25 | 67 | ND | ND | ND | ND |

Notes:
[1]Percentage of sPP resin in the blend
[2]Parts of isobutane mixed in one hundred parts of polymer resin
[3]Set temperature of the cooling zone where the foam was made
[4]Density of foam body aged for two months determined by water displacement in kg/m³
[5]Cell size in millimeters determined per ASTM D-3576
[6]Open cell content in percentage determined per ASTM D-2856-A
[7]Minimum volume of the foam body during aging at an ambient temperature as a percentage of the initial volume. The minimum volume occurred within a day for all foams
[8]Volume of foam body at the specified age at an ambient temperature as a percentage of the initial volume
ND = not determined As shown in Table II, the formulations containing up to 40 percent SPP resin produced good-quality foams. The 50/50 blend foam of LDPE/sPP at the chosen cooling temperature of 107° C. looked slightly hot. The thickness of the foams ranged from 6.1 mm to 8.2 mm and the width of the foam ranged from 14.7 mm to 18.4 mm. A specimen of approximately 15 cm in length was cut from each freshly prepared foam and the volume of the foam specimen was measured at approximately 2 minutes after extrusion and then periodically thereafter during aging at an ambient temperature.

Conclusions

The blends tend to give a larger cell size than the pure LDPE resin. Blends having 40 and 50 percent sPP tend to develop more open cells. The addition of the sPP resin is shown to improve the dimensional stability of the foam. A blend containing a sPP level of 30 percent or more provided a foam having satisfactory dimensional stability with a minimum foam volume during aging greater than 89 percent.

EXAMPLE 3 AND COMPARATIVE EXAMPLE C

Preparation of a sPP Resin and LDPE Resin Blend Foam

Example 3 demonstrates the preparation of foams according to the present invention which were prepared from a blend of LDPE resin and sPP resin wherein the level of blowing agent was varied in order to determine whether the foamability of the blends having a high sPP resin level could be improved by a high level of blowing agent. The cooling zone temperature was also lowered in order to determine its effect on foam expansion.

Granular blends of LDPE resin having a melt index of 0.7 dg/minute, (determined by ASTM D-1238 at 190° C./2.16 kg), a density of 0.923 g/cm³, and a melting point of 115° C. (determined per the differential scanning calorimetry (DSC) at the peak of an endotherm during heating at 10° C./minute) and EOD 96-07 grade syndiotactic form copolymer polypropylene resin (available from Fina Oil and Chemical Company) having a melt flow rate of 2 dg/minute, (determined by ASTM D-1238 at 230° C./2.16 kg), a density of 0.88 g/cm³, and a melting point of 130° C. in a predetermined ratio, as shown in Table III, were prepared.

The blend of granular resins and 0.2 pph talcum powder (nucleating Agent) was fed into the extruder at a uniform rate of 3.1 kg/h (due to a difference in the feeding characteristics among the blends, the actual extrusion rate varies slightly in the range from approximately 3 kg/h to 3.2 kg/h even though an effort is made to keep the rate the same by adjusting the screw rotating speed). The temperatures at the extruder zones was maintained at 160° C. at the feeding zone, 190° C. at the melting zone, 200° C. at the metering zone, and 220° C. at the mixing zone. The temperature of the cooling zone was maintained as indicated in Table III and isobutane (blowing agent) was injected into the mixing zone at the levels indicated in Table III. The temperature of the cooling zone was gradually reduced and the die opening adjusted to make a good foam. The die temperature was maintained at 110° C. for Comparative Example C and Examples Nos. 3.1 and 3.2, and at 100° C. for Example No. 3.3. Foam samples were taken at the optimum cooling zone temperature for each formulation as shown in Table III and at a die opening which varies from 1.1 mm to 1.2 mm.

The dimensional data for the foams are summarized in Table III along with the density, cell size, and open-cell data.

TABLE III

| Comp. Ex. or Ex. No. | sPP Level (%)[1] | Isobutane Level (pph)[2] | Foam Temp (° C.)[3] | Foam Density (kg/m³)[4] | Cell Size (mm)[5] | Open Cell (%)[6] | Dimensional Stability | | |
|---|---|---|---|---|---|---|---|---|---|
| | | | | | | | Min. (%)[7] | 1 day (%)[8] | 1 mon (%)[8] |
| C | 0 | 12.0 | 100 | 29.3 | 0.95 | 41 | 50 | 50 | 90 |
| 3.1 | 20 | 12.0 | 100 | 29.7 | 1.16 | 36 | 66 | 66 | 94 |

TABLE III-continued

| Comp. Ex. or Ex. No. | sPP Level (%)[1] | Isobutane Level (pph)[2] | Foam Temp (° C.)[3] | Foam Density (kg/m³)[4] | Cell Size (mm)[5] | Open Cell (%)[6] | Dimensional Stability | | |
|---|---|---|---|---|---|---|---|---|---|
| | | | | | | | Min. (%)[7] | 1 day (%)[8] | 1 mon (%)[8] |
| 3.2 | 50 | 11.4 | 90 | 29.1 | 1.35 | 36 | 99 | 102 | 104 |
| 3.3 | 60 | 14.0 | 82 | 33.3 | 2.31 | 81 | ND | ND | ND |

Notes:
[1]Percentage of sPP resin in the blend
[2]Parts of isobutane mixed in one hundred parts of polymer resin
[3]Set temperature of the cooling zone where the foam was made
[4]Density of foam body aged for two months determined by water displacement in kg/m³
[5]Cell size in millimeters determined per ASTM D-3576
[6]Open cell content in percentage determined per ASTM D-2856-A
[7]Minimum volume of the foam body during aging at an ambient temperature as a percentage of the initial volume. The minimum volume occurred within a day for all foams
[8]Volume of foam body at the specified age at an ambient temperature as a percentage of the initial volume
ND = not determined As shown in Table III, good foams were produced from blends containing up to 50 percent sPP resin. The 40/60 blend of LDPE/sPP was marginal in foam processability. In order to make a foam from the blend, the cooling zone temperature had to be lowered to as low as 82° C. The foam was marginally satisfactory with a high level of open cells. All the foams were of relatively low density reflecting a high level of blowing agent. Apparent open-cell contents of the foams are shown to be relatively high, greater than 36 percent. The ASTM D-2856-A open-cell method tends to overestimate the open-cell content for a flexible foam. The foams made in these examples are of lower density and of lower modulus than those made in Example 2 resulting in a greater measurement error in the open cell content. One explanation for the overestimation of open-cells is seen from the dimensional stability data for the LDPE foam. In spite of the relatively high apparent open cell content (41 percent), the foam shrank as much as 50 percent during aging and recovered relatively slowly.

EXAMPLE 4 AND COMPARATIVE EXAMPLE D

Preparation of Foam Prepared from sPP Resin and Ethylene/Vinyl Acetate Copolymer Resin Blend Example 4 demonstrates the preparation of foams according to the present invention which were prepared from a blend of ethylene/vinyl acetate copolymer (EVA) resin and varying amounts of sPP resin in order to determine the effect of the sPP resin level in the foamability of the blend and the dimensional stability of the foam. Comparative Example D was prepared from EVA resin only.

Granular blends of Elvax 460 brand resin (supplied by Du Pont-Dow Inc.), having a melt index of 2.5 dg/minute (determined by ASTM D-1238 at 230° C./2.16 kg), a density of 0.941 g/cm³, and a melting point of 88° C. and EOD 96-07 grade syndiotactic form copolymer polypropylene resin(Available from Fina Oil and Chemical Company) having a melt flow rate of 2 dg/minute, a density of 0.88 g/cm³, and a melting point of 130° C. in a predetermined ratio, as shown in Table IV, were prepared.

TABLE IV

| Comp. Ex. or Ex. No. | SPP Level (%)[1] | Isobutane Level (pph)[2] | Foam Temp (° C.)[3] | Foam Density (kg/m³)[4] | Cell Size (mm)[5] | Open Cell (%)[6] | Dimensional Stability | | | | | |
|---|---|---|---|---|---|---|---|---|---|---|---|---|
| | | | | | | | Min. (%)[7] | 1 day (%) | 10 days (%) | 1 mon (%)[8] | 2 mon (%) | 3 mon (%) |
| D   | 0  | 12.7 | 90 | 30.4 | 0.9 | 83 | 25 | 32 | 52  | 72  | 87  | 90  |
| 4.1 | 10 | 13.1 | 85 | 28.0 | 1.0 | 75 | 32 | 40 | 68  | 89  | 97  | 100 |
| 4.2 | 20 | 13.6 | 85 | 27.2 | 1.0 | 67 | 55 | 80 | 103 | 103 | 104 | 105 |
| 4.3 | 30 | 16.7 | 76 | 21.0 | 0.9 | 83 | 92 | 96 | 98  | 99  | 98  | 99  |
| 4.4 | 40 | 17.3 | 75 | 22.8 | 0.8 | 90 | 94 | 98 | 94  | 95  | 95  | 95  |

[1]Percentage of sPP resin in the blend
[2]Parts of isobutane mixed in one hundred parts of polymer resin
[3]Set temperature of the cooling zone where the foam was made
[4]Density of foam body aged for two months determined by water displacement in kg/m³
[5]Cell size in millimeters determined per ASTM D-3576
[6]Open cell content in percentage determined per ASTM D-2856-A
[7]Minimum volume of the foam body during aging at an ambient temperature as a percentage of the initial volume. The minimum volume occurred within a day for all foams
[8]Volume of foam body at the specified age at an ambient temperature as a percentage of the initial volume
ND = not determined The blend of granular resins and 0.4 pph talcum powder (nucleating agent) was fed into the extruder at a uniform rate of 3 kg/h (due to a difference in the feeding characteristics among the blends, the actual extrusion rate varies slightly as Shown in Table IV, drifting downward from 3 kg/h to 2.6 kg/h at a fixed screw rotating speed of the extruder). The temperatures at the extruder zones were maintained at 120° C. at the feeding zone, 150° C. at the melting zone, 180° C. at the metering zone, and 180° C. at the mixing zone. The temperature of the cooling zone was maintained as indicated in Table IV and isobutane (blowing agent) was injected into the mixing zone at the levels indicated in Table IV: 380 g/h for Comparative Example D and Examples Nos. 4.1 and 4.2 and 450 g/h for Examples Nos. 4.3 and 4.4.(due to the change in the feeding rate of polymer and blowing agent, the level of blowing agent in the resin varied from 12.7 pph to 17.3 pph (see Table IV). The die gap was fixed at 1.75 mm throughout the tests and the die temperature maintained at 0° C. to 5° C. lower than the cooling zone temperature. The dimensional stability data (see methods given in Example 1) for the foams are summarized in Table IV along with the density, cell size, and open-cell data.

As shown in Table IV, the good foams were produced from blends containing up to 40 percent sPP resin. Contrary to the open cell data, the foams made in Comparative Example D and Examples Nos. 4.1 and 4.2 were substantially close-celled when examined by a squeezing test with fingers. The foams made in Examples 4.3 and 4.4 felt open-celled. Again, the open-cell data for the soft polyolefin foams were not reliable. The EVA foam made in Comparative Example D suffered an excessive shrinkage (minimum volume=25 percent) even though ASTM D-2856-A indicated that the foam contained 83 percent open cells.

Conclusion

Again, blends of sPP resin and a foamable ethylene/vinyl acetate resin made good foams and sPP resin is shown to improve the dimensional stability and a sPP resin level 30 percent or greater yields a foam having satisfactory dimensional stability.

Test 5

Heat Stability of the Foam of Comparative Example D and Example 4

After aging for 16 days, the foams produced in Comparative Example D and Example 4 were subjected to the heat exposure test as described in Test 2. The foam specimens were put in an oven which had been maintained at 90° C. After 1 hour and then after 8 hours, the samples were removed and measured for changes in volume as shown in Table V.

TABLE V

| Comp. Ex. or Ex. | | Volume Retention | |
|---|---|---|---|
| No. | sPP Level (%)[1] | 1 h (%)[2] | 8 h (%) |
| D | 0 | 24 | 16 |
| 4.1 | 10 | 75 | 57 |
| 4.2 | 20 | 37 | 31 |
| 4.3 | 30 | 68 | 69 |
| 4.4 | 40 | 85 | 83 |

[1]Percentage of sPP resin in the blend
[2]Volume retention of foam body during aging at 90° C.

As shown in Table V, all foams shrank, but the foams containing sPP resin retained their volume to a greater extent than the foam (Comp. Ex. D) not containing sPP resin. The foam made from a blend containing 40 percent sPP resin retained 83 percent volume after 8 hours in the oven.

EXAMPLE 5

Preparation of Foam Prepared from sPP Resin and iPP Resin Blend

In Example 5, a blend of a foamable high melt strength (HMS) iPP resin and an sPP resin was used to prepare foams according to the present invention.

A 50/50 by weight granular blend of Pro-fax PF-814 grade high melt strength iPP resin (available from Montell Polyolefins Co. N.V.) having a melt index of 3 dg/minute (determined by ASTM D-1238 at 230° C./2.16 kg), a density of 0.90 g/cm$^3$, and a melting point of 160° C. and EOD 96-28 grade syndiotactic form copolymer polypropylene resin (available from Fina Oil and Chemical Company) having a melt flow rate of 2 dg/minute, a density of 0.88 g/cm$^3$, and a melting point of 130° C. was prepared.

The granular blend resins and an additive package consisting of talcum powder ([4]nucleating agent) at 0.2 parts per hundred parts of resins (pph) and Irganox 1010 brand antioxidant (available from Ciba-Geigy Corp.) at 0.1 pph, were premixed and fed into the extruder at a uniform rate of 4.2 kg/h. The temperatures were maintained at the cooling zone, at 160° C. at the feeding zone, 190° C. at the melting zone, 200° C. at the metering zone, and 200° C. at the mixing zone. Isobutane (blowing agent) was injected into the mixing zone at a uniform rate of 10.7 pph. The die opening was maintained at approximately 0.8 mm. The temperature of the cooling zone was adjusted and the die opening was adjusted to produce foams. At cooling zone temperatures in the range of from 170° C. to 160° C., good foams of substantially closed-cell structure were obtained. For example, a foam made at 160° C. had a density of 26.3 kg/M$^3$, cell size of 1.8 mm, open-cell content of 17 percent, thickness of approximately 11 mm and width of approximately 20 mm. The foam was strong and tough.

COMPARATIVE EXAMPLE E

Preparation of Foam Prepared from sPP Resin and iPP Resin Blend

In Comparative Example E, the procedure of Example 5 was repeated, but using a 20/80 blend of the same iPP and sPP resins rather than a 50/50 blend. At a cooling zone temperature scanned from 180° C. down to 150° C., no foam could be produced.

EXAMPLE 6 AND COMPARATIVE EXAMPLE F

Preparation of Foam Prepared from sPP Resin and Polystyrene Resin Blend

In Example 6, blends of a polystyrene (PS) resin and a sPP resin were expanded with $CO_2$, using the same apparatus and essentially the same procedure as used in Example 1. Comparative Example F was prepared from PS resin only.

Granular blends of PS resin having an average molecular weight of 150,000, a density of 1.05 g/cm$^3$, and a $T_g$ of 104° C. and EOD96-07 Grade sPP resin (available from Fina Oil and Chemical Company) having a melt flow rate of 2 dg/minute (determined by ASTM D-1238 at 230° C./2.16 kg), a density of 0.88 g/cm$^3$, and a melting point of 130° C. in a predetermined ratio, as shown in Table VI, were prepared.

The blend of granular resins and 0.1 pph barium stearate was premixed and fed into the extruder at a uniform rate. The temperatures at the extruder were maintained as follows: 130° C. at feeding zone; 160° C. at melting zone; 200° C. at metering zone; and 200° C. at mixing zone. Carbon dioxide was injected into the mixing zone at a uniform rate of 4.6 pph. The temperature of the cooling zone was adjusted in the range of from 132° C. to 134° C. to produce good foams. The die temperature was maintained at a uniform 145° C. throughout the processes. The die opening was maintained at a fixed opening of 1.5 mm. Thickness, foam density, cell size, and open cell content are shown in Table VI.

TABLE VI

| Comp. Ex. Ex. or Ex. No. | SPP level (%)[1] | Extr. Rate (kg/h)[2] | Thickness (mm)[3] | Width (mm)[4] | Foam Density (kg/m³)[5] | Cell Size (mm)[6] | Open Cell (%)[7] |
|---|---|---|---|---|---|---|---|
| F | 0 | 4.8 | 16 | 19 | 61.6 | 0.33 | 0 |
| 6.1 | 2 | 4.1 | 20 | 23 | 64.8 | 0.70 | 0 |
| 6.2 | 5 | 3.9 | 19 | 22 | 66.5 | 0.69 | 0 |
| 6.3 | 20 | 3.7 | 17 | 22 | 70.0 | 1.44 | 27 |

[1]Percent of sPP resin in the blend
[2]Extrusion rate of polymer resin in kg/h
[3]Thickness of foam body in millimeters
[4]Width of foam body in millimeters
[5]Density of foam body aged for one week in kg/m³ determined by water displacement
[6]Cell size in millimeters determined per ASTM D-3576
[7]Open cell content in percentage determined per ASTM D-2856-A As shown in Table VI, the sPP resin makes the cross-sectional size and the cell size larger. The foams containing 2 percent and 5 percent sPP resin are shown to have no open cells. The 80/20 PS/sPP resins blend provides a foam having some open-cells.

What is claimed is:

1. A blended polymer foam comprising:
   a) from 0.1% to 60% by weight of a syndiotactic polypropylene resin; and
   b) from 40% to 99.9% by weight of a foamable thermoplastic polymer resin,
      wherein when the foamable thermoplastic polymer resin is isotactic polypropylene, the isotactic polypropylene resin has a tan delta less than 1.5 and the blended polymer foam has a density in the range from 9 kg/m³ to 100 kg/m³.

2. The blended polymer foam according to claim 1 wherein the foam has a density of 11 kg/m³ to 100 kg/m³.

3. The blended polymer foam according to claim 2 wherein the foam has a density of 15 kg/m³ to 50 kg/m³.

4. The blended polymer foam according to claim 1 wherein the foamable thermoplastic polymer resin is a flexible thermoplastic polymer resin.

5. The blended polymer foam according to claim 1 wherein the foamable thermoplastic polymer resin is a rigid thermoplastic polymer resin.

6. The blended polymer foam according to claim 4 wherein the foamable thermoplastic polymer resin is a flexible polyolefin resin.

7. The blended polymer foam according to claim 6 wherein the flexible polyolefin resin is a LDPE resin.

8. The blended polymer foam according to claim 7 wherein the LDPE resin has a melt index of from 0.1 dg/minute to 20 dg/minute.

9. The blended polymer foam according to claim 1 wherein the syndiotactic polypropylene resin is a homopolymer of propylene.

10. The blended polymer foam according to claim 9 wherein the syndiotactic polypropylene resin has a melt flow rate of from 0.1 dg/min to 10 dg/min.

11. The blended polymer foam according to claim 9 wherein the syndiotactic polypropylene resin has a syndiotacticity of greater than 75%.

12. The blended polymer foam according to claim 1 wherein the syndiotactic polypropylene resin is a copolymer of propylene with ethylene.

13. The blended polymer foam according to claim 12 wherein the syndiotactic polypropylene resin has a melt flow rate of from 0.1 dg/min to 10 dg/min.

14. The blended polymer foam according to claim 12 wherein the syndiotactic polypropylene resin has a syndiotacticity of greater than 75%.

15. The blended polymer foam according to claim 1 wherein the syndiotactic polypropylene resin is a copolymer of propylene with 1-butene.

16. The blended polymer foam according to claim 15 wherein the syndiotactic polypropylene resin has a melt flow rate of from 0.1 dg/min to 10 dg/min.

17. The blended polymer foam according to claim 15 wherein the syndiotactic polypropylene resin has a syndiotacticity of greater than about 75%.

18. The blended polymer foam according to claim 4 wherein the flexible polyolefin resin is an ethylene/vinyl acetate copolymer resin.

19. The blended polymer foam according to claim 18 wherein the ethylene/vinyl acetate copolymer resin has a vinyl acetate content of from 5 percent to 30 percent.

20. The blended polymer foam according to claim 18 wherein the ethylene/vinyl acetate copolymer resin has a melt index of from 0.2 dg/min to 10 dg/min.

21. The blended polymer foam according to claim 4 wherein the flexible polyolefin resin is a foamable isotactic polypropylene resin.

22. The blended polymer foam according to claim 21 wherein the foamable isotactic polypropylene resin has a tan delta less than 1.2.

23. The blended polymer foam according to claim 5 wherein the rigid thermoplastic polymer resin is a polystyrene resin.

24. The blended polymer foam according to claim 23 wherein the polystyrene resin has an average molecular weight of less than 240,000.

25. The blended polymer foam according to claim 4 wherein the weight-ratio of the syndiotactic polypropylene resin to the flexible thermoplastic polymer resin in the blended foam is in the range of from 10:90 to 50:50.

26. The blended polymer foam according to claim 25 wherein the weight-ratio of the syndiotactic polypropylene resin to the flexible thermoplastic polymer resin in the blended fan is in the range of from 30:70 to 50:50.

27. The blended polymer foam according to claim 1 wherein the blended foam is prepared by an extrusion process.

28. The blended polymer foam according to claim 27 wherein the extrusion process utilizes isobutane as a blowing agent.

29. The blended polymer foam according to claim 27 wherein the extrusion process utilizes carbon dioxide as a blowing agent.

30. The blended polymer foam according to claim 1 wherein the blended foam has a cell size of from 0.01 mm to 10 mm.

31. The blended polymer foam according to claim 1 wherein the blended foam is uncross-linked.

32. The blended polymer foam according to claim 1 wherein the blended foam is cross-linked.

33. The blended polymer foam according to claim 1 wherein the blended foam is in the form of a sheet.

34. The blended polymer foam according to claim 1 wherein the blended foam is in the form of a plank.

35. The blended polymer foam according to claim 1 wherein the blended foam is in the form of a coalesced strand foam plank.

36. The blended polymer foam according to claim 1 wherein the blended foam is in the form of beads.

* * * * *